Dec. 9, 1952　　　A. MERHIGE ET AL　　　2,621,093
TRAY ATTACHMENT FOR MOTOR VEHICLE INSTRUMENT PANELS
Filed Sept. 28, 1949　　　2 SHEETS—SHEET 1
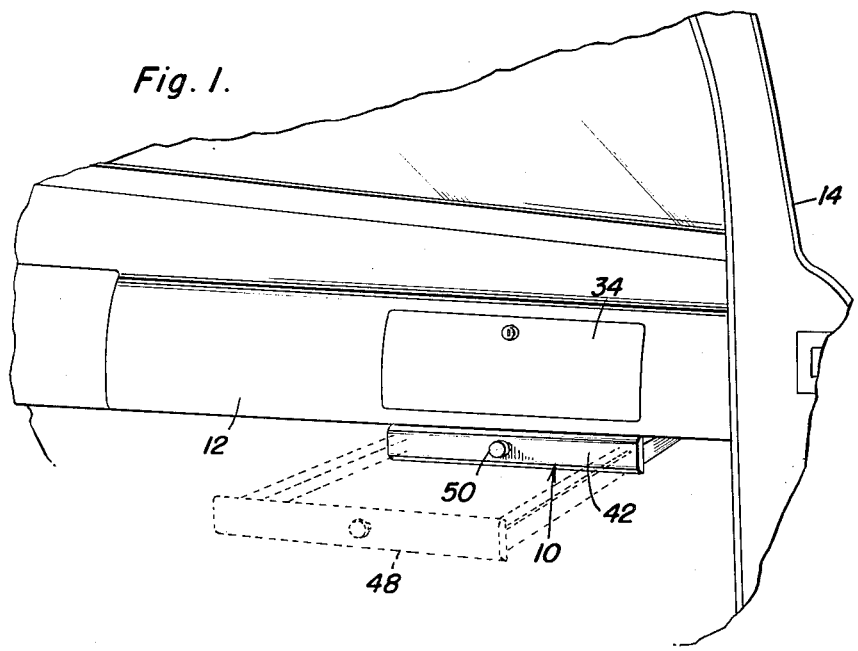
Fig. 1.
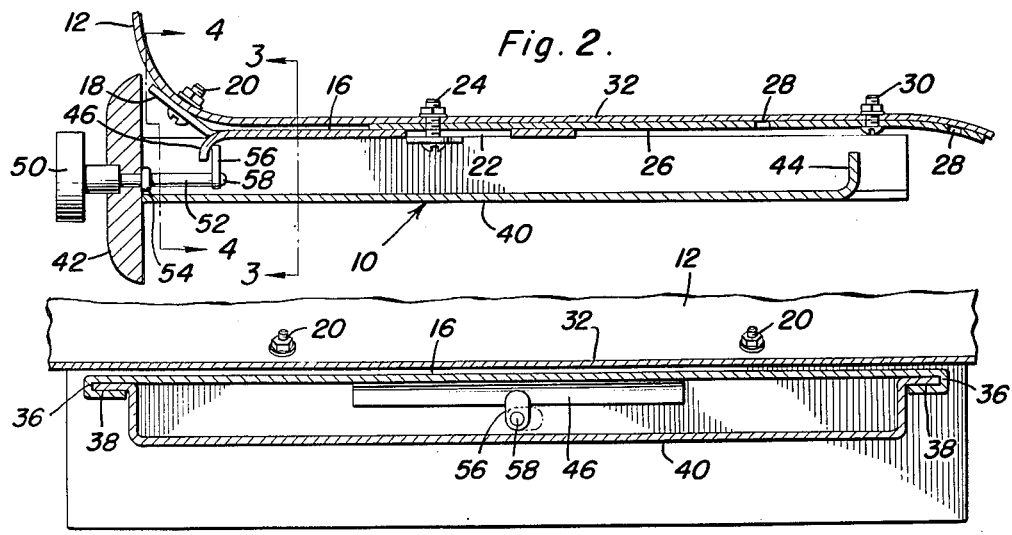
Fig. 2.
Fig. 3.
Alexander Merhige
Victor J. Luke
INVENTORS.

Dec. 9, 1952     A. MERHIGE ET AL     2,621,093
TRAY ATTACHMENT FOR MOTOR VEHICLE INSTRUMENT PANELS
Filed Sept. 28, 1949     2 SHEETS—SHEET 2
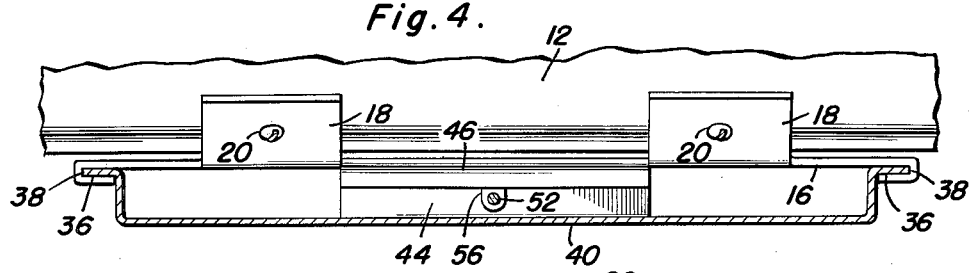
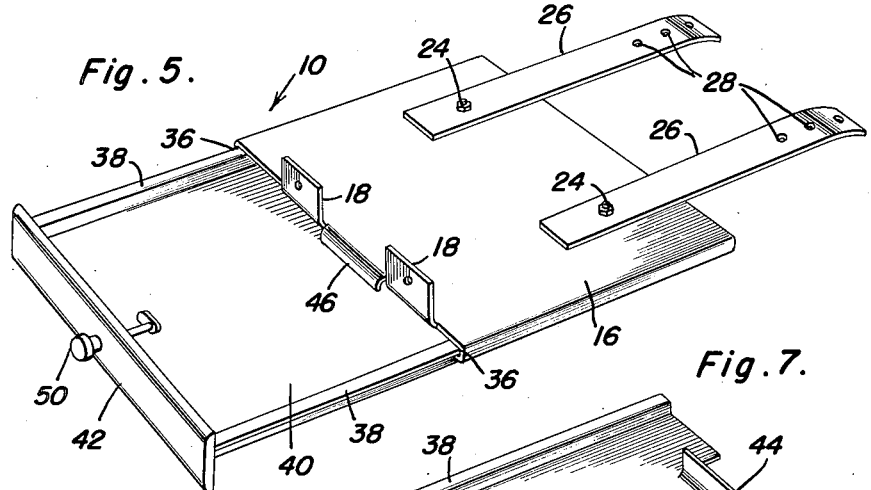
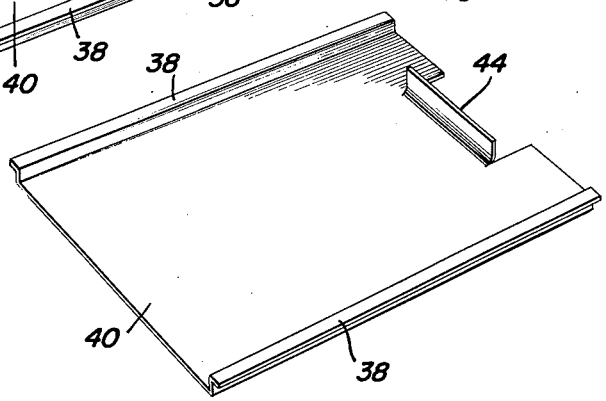
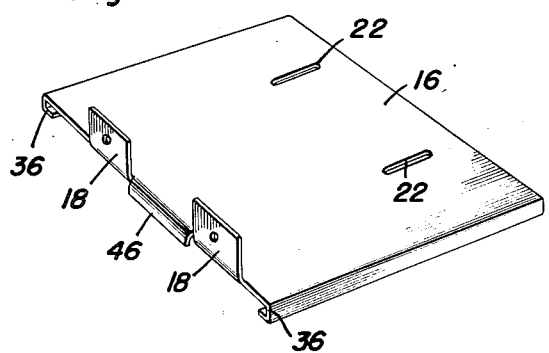
Alexander Merhige
Victor J. Luke
INVENTORS.
BY *Clarence A. O'Brien*
*and Harvey B. Jacobson*
Attorneys Patented Dec. 9, 1952

2,621,093

UNITED STATES PATENT OFFICE 2,621,093

TRAY ATTACHMENT FOR MOTOR VEHICLE
INSTRUMENT PANELS

Alexander Merhige and Victor J. Luke,
New Orleans, La.

Application September 28, 1949, Serial No. 118,304

1 Claim. (Cl. 311—21)

This invention relates to new and useful improvements and structural refinements in tray attachments for vehicles, such as automobiles, etc., and the principal object of the invention is to provide a serving tray, so to speak, mounted under the usual instrument panel of the vehicle and adapted to receive food thereon in so-called "curb service."

An important feature of the invention resides in the attachment thereof to the instrument panel, while another feature resides in the provision of a drawer-like tray panel which may be easily and quickly slid out of the way when the use thereof is not desired.

Some of the advantages of the invention lie in its simplicity of construction, in its pleasing appearance, and in its adaptability for use in association with vehicles of different types.

With the above more important objects and features in view and such other objects and features as may become apparent as this specification proceeds, the invention consists essentially of the arrangement and construction of parts as illustrated in the accompanying drawings, in which:

Figure 1 is a fragmentary perspective view of a vehicle instrument panel, showing the invention attached thereto;

Figure 2 is a longitudinal sectional view of the invention applied to the instrument panel;

Figure 3 is a cross sectional view, taken substantially in the plane of the line 3—3 in Figure 2;

Figure 4 is a cross sectional view, taken substantially in the plane of the line 4—4 in Figure 2;

Figure 5 is a perspective view of the invention per se;

Figure 6 is a perspective view of the supporting plate used in the invention; and Figure 7 is a perspective view of the tray panel used therein.

Like characters of reference are employed to designate like parts in the specification and throughout the several views.

Referring now to the accompanying drawings in detail, the invention consists of a tray attachment designated generally by the reference character 10, which is adapted to be mounted under the usual instrument panel 12 of an automotive vehicle 14, the attachment 10 embodying in its construction a supporting plate 16 provided at its forward edge with a pair of bendable brackets or ears 18 which, in turn, are attachable by suitable screws 20 to the lower edge portion of the instrument panel 12, as is best shown in Figures 2 and 4.

The rear portion of the plate 16 is formed with a pair of slots 22 adapted to adjustably receive screws 24 extending through forward end portions of a pair of supporting straps 26 which are also bendable and are provided in rear portions thereof with rows of apertures 28 to receive additional screws 30.

The screws 24, 30 preferably extend through the bottom 32 of a glove box 34, usually provided in the instrument panel 12, and it is to be noted that by virtue of the slots 22, the rows of apertures 28 and the bendability of the brackets 18 and straps 26, the plate 16 may be secured to the underside of instrument panels and glove boxes of various different types and configurations.

In any event, it is to be noted that side edge portions of the plate 16 are angulated downwardly and inwardly so as to provide a pair of spaced, opposing channels 36 which are adapted to slidably accommodate a pair of guide rails 38 constituted by upwardly and outwardly angulated side edge portions of a tray panel 40. This panel is disposed in spaced relation under the plate 16 and is provided at the front edge thereof with a suitable upstanding wall 42, while an intermediate rear edge portion of the panel 40 is upturned so as to afford a stop member 44 which is engageable with a downturned flange 46 provided at the forward edge of the plate 16 between the brackets 18. In this manner, excessive outward sliding of the panel 40 in the channels 36 will be effectively prevented.

Needless to say, the panel 40 may be slid from an inoperative position under the glove box 34 as shown in Figure 1, to an operative or outwardly extended poistion indicated by the phantom lines 48 in Figure 1, the sliding of the panel being effected by a suitable pull knob 50, which is provided on the front face of the wall 42 and includes a rotatable shaft 52 journaled in the wall 42 and projecting rearwardly therefrom, as indicated in Figure 2. A suitable shoulder 54 is provided intermediate the ends of the shaft 52 and engages the rear surface of the wall 42 for preventing the shaft from sliding forwardly, while a latch member 56 is secured by a screw 58 to the rear end of the shaft and is engageable with the flange 46 for locking the tray panel 40 in its rearwardly slid position.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A tray attachment for instrument panels of automotive vehicles, comprising a supporting plate having a rear end portion provided with a pair of slots, a set of bendable brackets projecting from the front edge of said plate and secured to the underside of an automobile instrument panel, a pair of bendable straps positioned on and extending rearwardly from said plate and adapted for having their rear end portions secured to a support under said instrument panel, fastening elements extending through said slots and through front end portions of said straps for adjustably securing the latter to said plate, opposite side edge portions of the plate being turned downwardly and inwardly to provide a pair of parallel guide channels, and a tray panel positioned under said plate and slidable forwardly and rearwardly in said channels.

ALEXANDER MERHIGE.
VICTOR J. LUKE.

REFERENCES CITED

The following references are of record in the file of this patent:

UNITED STATES PATENTS

| Number | Name | Date |
|---|---|---|
| 881,511 | Waters | Mar. 10, 1908 |
| 1,870,444 | Dungan | Aug. 9, 1932 |
| 1,951,261 | Thompson | Mar. 13, 1934 |
| 2,170,013 | Detwiler | Aug. 22, 1939 |
| 2,177,575 | Maxwell | Oct. 24, 1939 |
| 2,205,974 | Kramer | June 25, 1940 |
| 2,292,797 | Roberts | Aug. 11, 1942 |
| 2,293,496 | Egger | Aug. 18, 1942 |
| 2,435,151 | Morgan | Jan. 27, 1948 |
| 2,568,102 | Weiss | Sept. 18, 1951 |